United States Patent
Gelardi et al.

(10) Patent No.: US 7,708,138 B2
(45) Date of Patent: *May 4, 2010

(54) SYSTEMS AND METHODS FOR PACKAGING MEDIA DISCS

(75) Inventors: John A. Gelardi, Kennebunkport, ME (US); Rune K. Haraldsson, Chester, VA (US)

(73) Assignee: MeadWestvaco Corporation, Richmond, VA (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/163,215

(22) Filed: Oct. 11, 2005

(65) Prior Publication Data

US 2006/0054520 A1    Mar. 16, 2006

Related U.S. Application Data

(63) Continuation-in-part of application No. 10/259,341, filed on Sep. 27, 2002, now Pat. No. 7,070,048.

(60) Provisional application No. 60/339,510, filed on Dec. 11, 2001.

(51) Int. Cl.
    *B65D 85/57* (2006.01)

(52) U.S. Cl. ............ 206/308.1; 206/312; 53/397

(58) Field of Classification Search ......... 206/308.1, 206/312, 313, 472, 473, 493, 232, 311; 53/397, 53/410, 147
See application file for complete search history.

(56) References Cited

U.S. PATENT DOCUMENTS

| 3,463,353 | A | * | 8/1969 | Peebles ............... 206/514 |
| 3,469,686 | A | * | 9/1969 | Gutsche et al. ........ 206/712 |
| 4,327,831 | A |   | 5/1982 | Inaba et al. |
| 4,823,950 | A | * | 4/1989 | Roze ................... 206/311 |
| 4,844,260 | A |   | 7/1989 | Jaw |
| 4,892,189 | A |   | 1/1990 | Kunimune et al. |
| 4,917,242 | A | * | 4/1990 | Jeruzal ................ 206/318 |
| 4,972,951 | A | * | 11/1990 | Vartanian ........... 206/387.1 |
| 5,255,816 | A |   | 10/1993 | Trepp |
| 5,344,008 | A | * | 9/1994 | DeBlasio et al. ........ 206/256 |
| 5,575,387 | A |   | 11/1996 | Gelardi |
| 5,615,773 | A | * | 4/1997 | Sturdivant .......... 206/387.1 |
| 5,657,870 | A | * | 8/1997 | Schottle et al. ...... 206/459.5 |

(Continued)

FOREIGN PATENT DOCUMENTS

CH    678370 A5    8/1991

(Continued)

OTHER PUBLICATIONS

International Search Report WO2007047142A1, dated Apr. 26, 2007.

*Primary Examiner*—Jacob K Ackun, Jr.
(74) *Attorney, Agent, or Firm*—Thomas A. Boshinski

(57) ABSTRACT

In a method for manufacturing a package for holding multiple media discs, comprising, a plurality of media disc trays is provided, each tray having a side hinging surface. The trays are arranged into a stack, such that their respective side hinging surfaces line up with each other to form a composite hinging surface. A label is positioned over the composite hinging surface. The label is affixed to the composite hinging surface, such that the label provides a hinge between each tray in the stack and at least one adjacent tray.

13 Claims, 10 Drawing Sheets

U.S. PATENT DOCUMENTS

| | | | |
|---|---|---|---|
| 5,671,856 A * | 9/1997 | Lisch | 220/4.27 |
| 5,715,933 A * | 2/1998 | Monahan | 206/1.7 |
| 5,727,681 A | 3/1998 | Li | |
| 5,749,464 A | 5/1998 | Cheris et al. | |
| 5,765,695 A | 6/1998 | Picciallo | |
| 5,799,782 A * | 9/1998 | Gelardi | 206/308.1 |
| 5,839,576 A | 11/1998 | Kim | |
| 6,179,121 B1 | 1/2001 | Ferguson et al. | |
| 6,199,689 B1 | 3/2001 | Higuchi et al. | |
| H1954 H | 4/2001 | Takashima | |
| 6,360,890 B1 | 3/2002 | Proffit | |
| 6,626,290 B2 | 9/2003 | Byrne et al. | |
| 6,702,331 B2 | 3/2004 | Derraugh et al. | |
| 7,070,048 B2 * | 7/2006 | Gelardi et al. | 206/308.1 |
| 7,325,677 B2 | 2/2008 | Gelardi et al. | |
| 2002/0038770 A1 | 4/2002 | Liu | |
| 2006/0289318 A1 | 12/2006 | Gelardi et al. | |
| 2007/0000803 A1 | 1/2007 | Gelardi et al. | |

FOREIGN PATENT DOCUMENTS

| | | |
|---|---|---|
| DE | 29518620 U1 | 1/1996 |
| EP | 0420387 A | 4/1991 |
| EP | 0729850 A1 | 9/1996 |
| EP | 0801012 A | 10/1997 |
| EP | 1205936 A | 5/2002 |
| JP | 7-24790 | 5/1995 |
| JP | 10147391 A | 6/1998 |
| WO | WO2004/071784 | 8/2004 |
| WO | WO2004071785 A2 | 8/2004 |
| WO | WO2005006336 A | 1/2005 |

* cited by examiner

SYSTEMS AND METHODS FOR PACKAGING MEDIA DISCS

CROSS-REFERENCE TO RELATED PATENT APPLICATIONS

This application is a continuation-in-part of U.S. patent application Ser. No. 10/259,341, filed on Sep. 27, 2002, the entire contents of which are incorporated herein by reference.

BACKGROUND OF THE INVENTION

1. Field of the Invention

The present invention relates to improvements in the field of packaging goods for retail sale, and more specifically to improved systems and methods for packaging media discs.

2. Description of Prior Art

It is becoming increasingly common for CDs, DVDs, and other types of media discs to be sold in sets. The design of suitable packaging for holding a plurality of media discs presents an ongoing challenge to the packaging industry. A key consideration in a successful package design is manufacturing cost. Packages are sold in extremely high volumes. Thus, even a difference of a fraction of a cent per unit can be a significant factor in the success or failure of a particular package design. However, the packaging industry is highly competitive. Thus, in order to compete successfully in the marketplace, it is also important for a package manufacturer to produce packages that are functional, durable, and esthetically pleasing.

SUMMARY OF THE INVENTION

These and other issues are addressed by aspects of the present invention. A first aspect of the invention provides a method for manufacturing a package for holding multiple media discs. A plurality of media disc trays is provided, each tray having a side hinging surface. The trays are arranged into a stack, such that their respective hinging surfaces are aligned with each other to form a composite hinging surface. A label is positioned across the composite hinging surface. The label is then affixed to the composite hinging surface, such that the label hinges each tray in the stack to an adjacent tray.

A further aspect of the invention provides a package for holding multiple media discs. The package includes a stack of media disc trays, each tray having at one side a hinging edge. The hinging edges are lined up with each other to form a composite hinging surface. A label is affixed to the composite hinging surface. The label provides a hinge between adjacent trays in the stack.

Additional features and advantages of the present invention will become apparent by reference to the following detailed description and accompanying drawings.

DETAILED DESCRIPTION

As used herein, the terms "media disc" and "disc" refer generally to compact discs (CDs), digital versatile discs (DVDs), and the like. The terms "media disc tray," "disc tray," and "tray" refer generally to trays for holding media discs and the like. Except as otherwise specifically described and claimed herein, it is not intended to limit the scope of the present invention to any particular type or shape of media disc or media disc tray.

Figure 1:
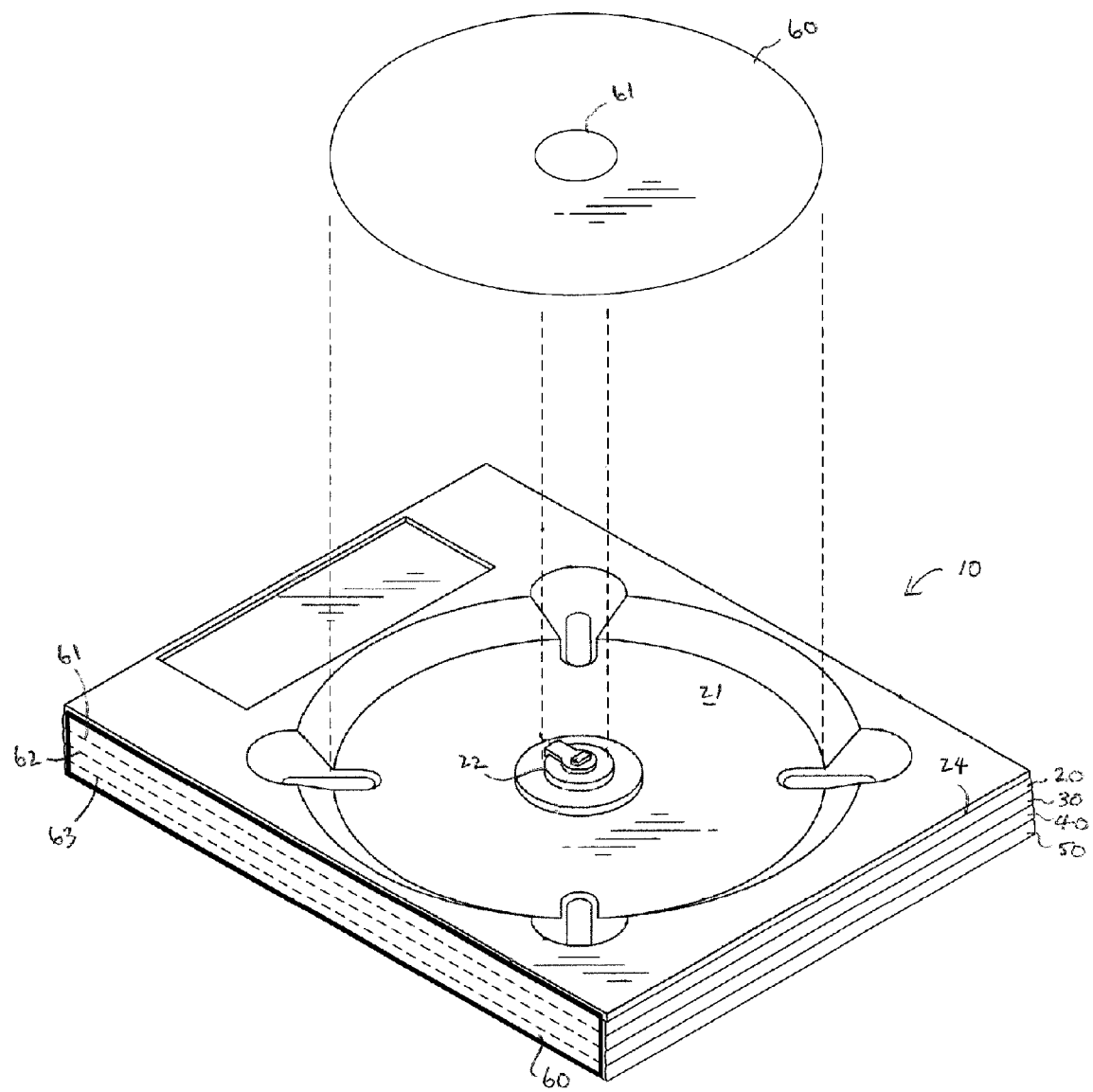
FIGS. 1 and 2 show, respectively, an isometric view and an exploded view of a package for multiple media discs according to a first aspect of the invention.
Figure 2:
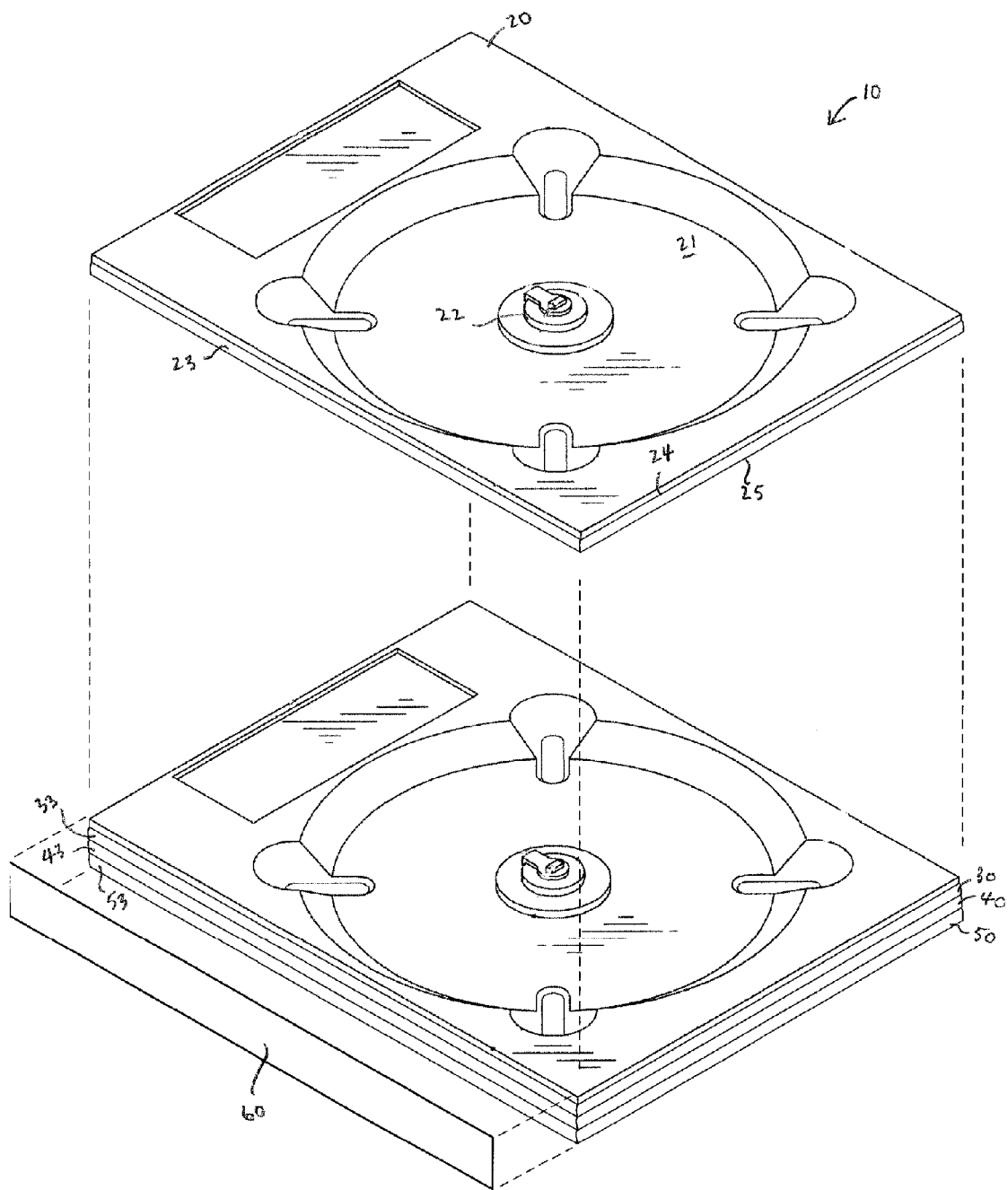

FIGS. 1 and 2 show, respectively, an isometric view and an exploded view of a package 10, according to a first aspect of the invention, for holding media discs. The package 10 comprises a plurality of media disc trays 20, 30, 40 and 50 that have been arranged into a stack. The number of trays in the stack may be modified, as desired, without departing from the spirit of the invention. FIG. 1 shows an exemplary media disc 60 suitable for loading into tray 20. The media disc 60 includes a central spindle hole 62.

In FIG. 2, tray 20 has been separated from the other trays in the stack for purposes of illustration. According to the present aspect of the invention, the four media trays 20, 30, 40, and 50 in the stack are identical to each other. However, as discussed below, it is also possible to include different types of trays in the stack without departing from the spirit of the invention.

Tray 20 is fabricated from a rigid plastic, or like material, and has a generally thin, flat shape, allowing a plurality of trays to be stacked on top of each other in a stable configuration. The tray 20 includes a cavity 21 that is shaped to closely receive media disc 60. At the center of the cavity 21 there is provided a hub 22 that engages the spindle hole 62 of the media disc 60 to hold it securely within the cavity 21. The tray 20 is designed such that when a media disc 60 is seated securely within the cavity 21, the upper surface of the media disc 60 is slightly recessed below the upper surface of the tray 20.

The tray 20 includes a side hinging surface 23. In FIGS. 1 and 2, the hinging surface 23 is located at the left side of the tray 20 when viewed from above. However, the location of the hinging surface 23 may be modified without departing from the spirit of the invention. Each of the other trays 30, 40 and 50 in the stack has a corresponding hinging surface 33, 43, and 53. When the trays 20, 30, 40 and 50 are arranged into a stack, their respective hinging surface 23, 33, 43, and 53 line up with each other to form a substantially continuous composite hinging surface.

In the package 10 shown in FIGS. 1 and 2, the stacked trays 20, 30, 40 and 50 are substantially identical to each other. However, it will be appreciated that different types of trays may be used in the stack without departing from the spirit of the present invention. For example, it would be possible to place into the stack trays having different shapes, trays having cavities capable of receiving more than one media disc, trays having more than one receiving cavity, and trays having other distinct features, so long as these trays have hinging edges that can form part of a composite hinging surface when the trays are arranged into a stack.

As shown in FIGS. 1 and 2, the trays 20, 30, 40 and 50 are hinged together by affixing a label 60 onto the composite hinging surface formed by edges 23, 33, 43, and 53. The label 60 is fabricated from a thin, flexible sheet of plastic, or like material. When the label 60 is mounted onto the composite hinging surface, it will be seen that it provides hinges 61, 62, and 63 between adjacent trays in the stack, allowing the stack of trays to be fanned open to provide access to the contents of each tray. Specifically, the label 60 provides a first hinge 61 between trays 20 and 30, a second hinge 62 between trays 30 and 40, and a third hinge 63 between trays 40 and 50.

As shown in FIGS. 1 and 2, the label 60 is substantially coextensive with the composite hinging surface formed by hinging edges 23, 33, 43 and 53. In other words, the label 60 is approximately the same size and shape as the composite hinging surface. If the label 60 is fabricated from a clear material, this arrangement causes the label to be almost invisible to a casual observer, which may enhance the overall visual appeal of the package 10.

It should be noted, however, that the shape, color, and general appearance of the label 60 may be varied, so long as the label 60 is firmly affixed to all of the trays in the stack. For example, the label 60 may be provided with text, graphics, or other printed matter, and may have different shapes, sizes, and colors, and may be transparent, translucent, or opaque, as desired.

Figure 3:
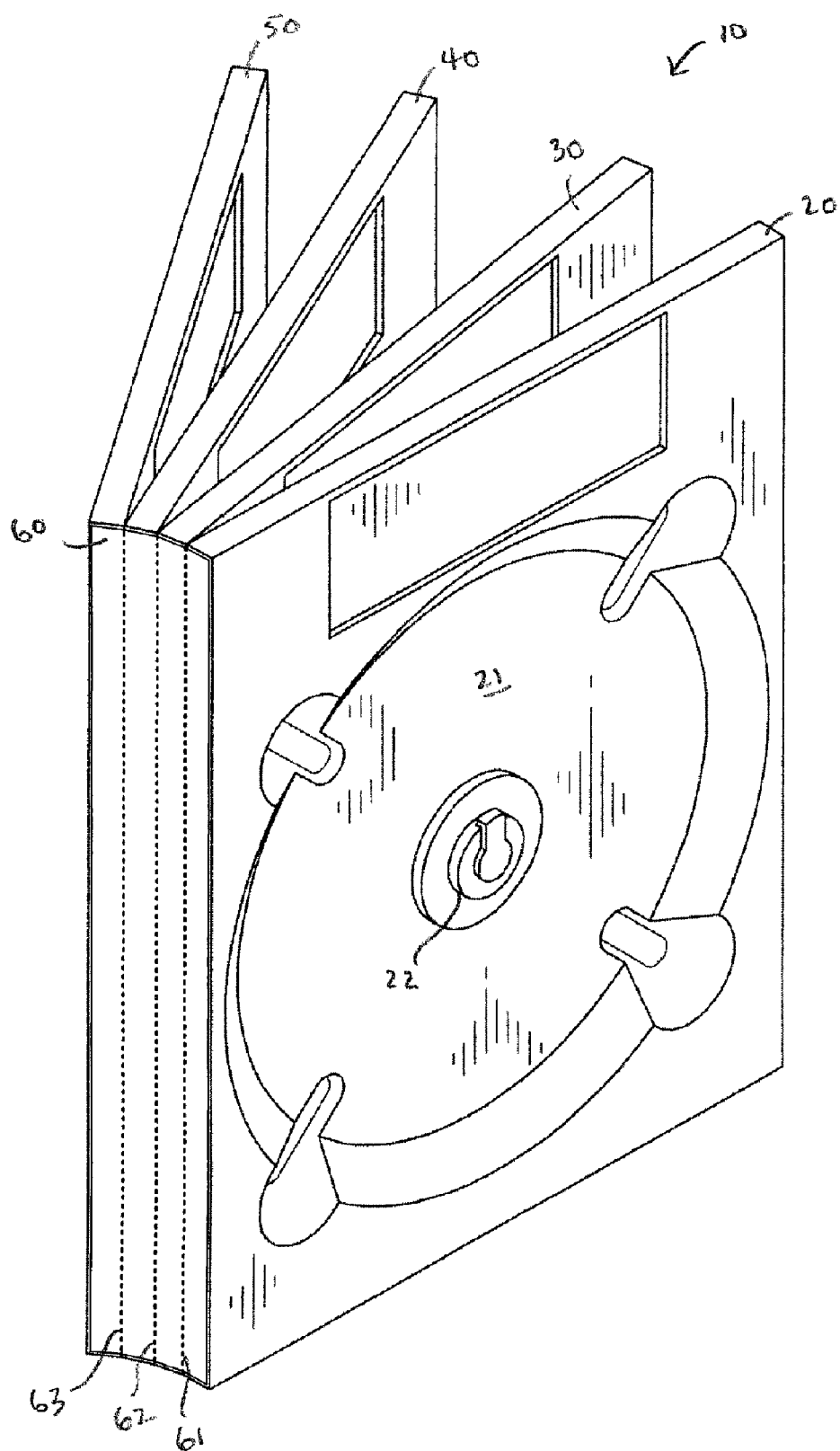
FIG. 3 shows an isometric view of the package shown in FIGS. 1 and 2, in which the package has been partially fanned open.

FIG. 3 shows an isometric view of the package 10, in which the package 10 has been partially fanned open. It will be appreciated that the present hinging arrangement allows each adjacent pair of trays in the stack to be fanned open to the point at which their respective hinge edges butt up against each other. At this point, the adjacent trays are fanned open to an angle of approximately 180 degrees. A user of the package is thus provided with maximum access to the contents of each individual tray in the stack.

Figure 4:
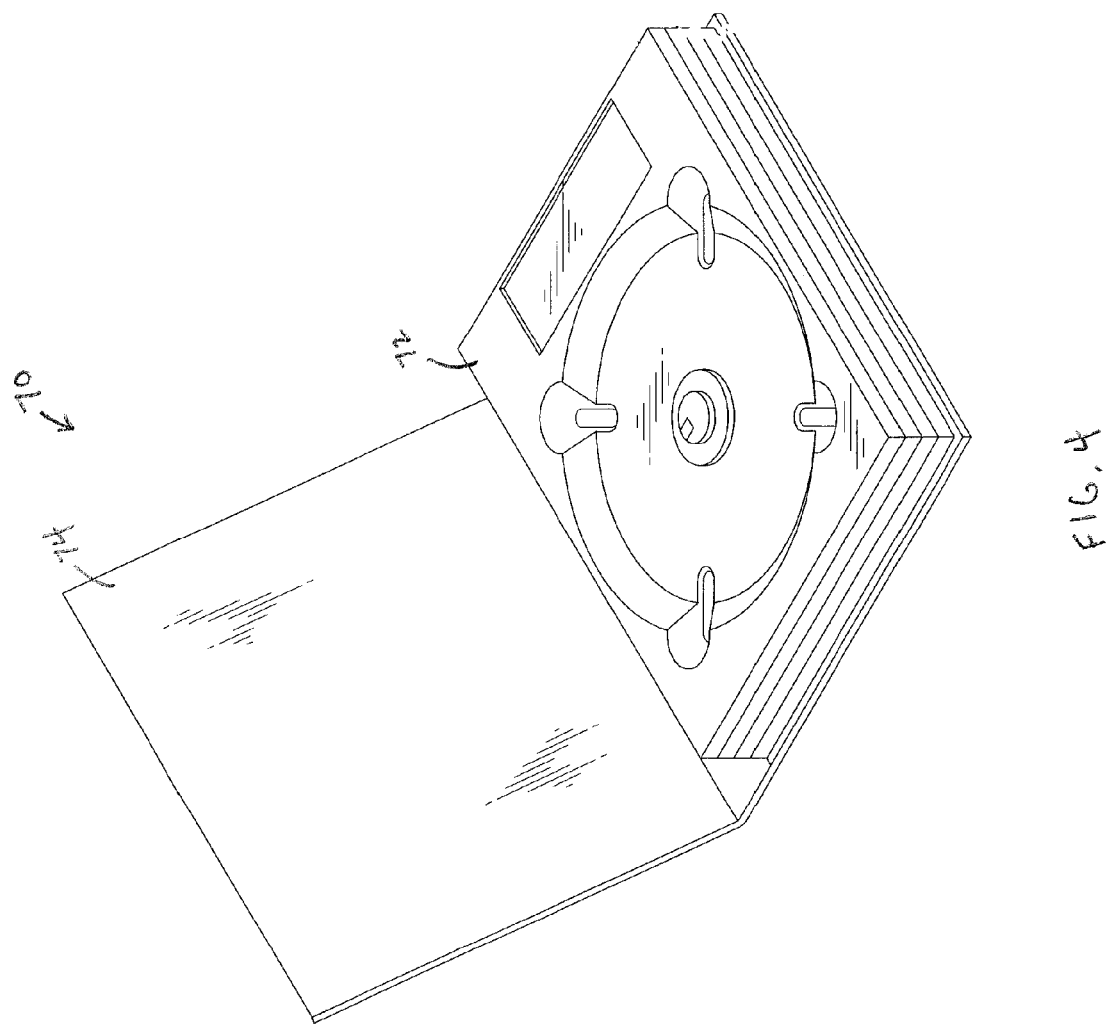
FIG. 4 shows an isometric view of a package for multiple media discs according to a further aspect of the invention.

FIG. 4 shows an isometric view of a package 70 according to a further aspect of the invention. The package 70 includes a hinged tray stack 72 of the type illustrated in FIGS. 1-3. The bottom tray of the stack 72 is mounted to an interior panel of an outer jacket 74.

According to a further aspect of the invention, in order to increase the stability of the package 10 shown in FIGS. 1-3 when the package 10 is in its closed configuration, the trays 20, 30, 40, and 50 are provided with structural elements that allow each tray in the stack to nest into an adjacent tray. The uppermost tray 20 in the stack includes, at its upper perimeter, a nesting ledge 24. The lower perimeter of the tray 20 includes a nesting rim 25. The other trays in the stack 30, 40 and 50 include corresponding nesting ledges and nesting rims.

Figure 5:
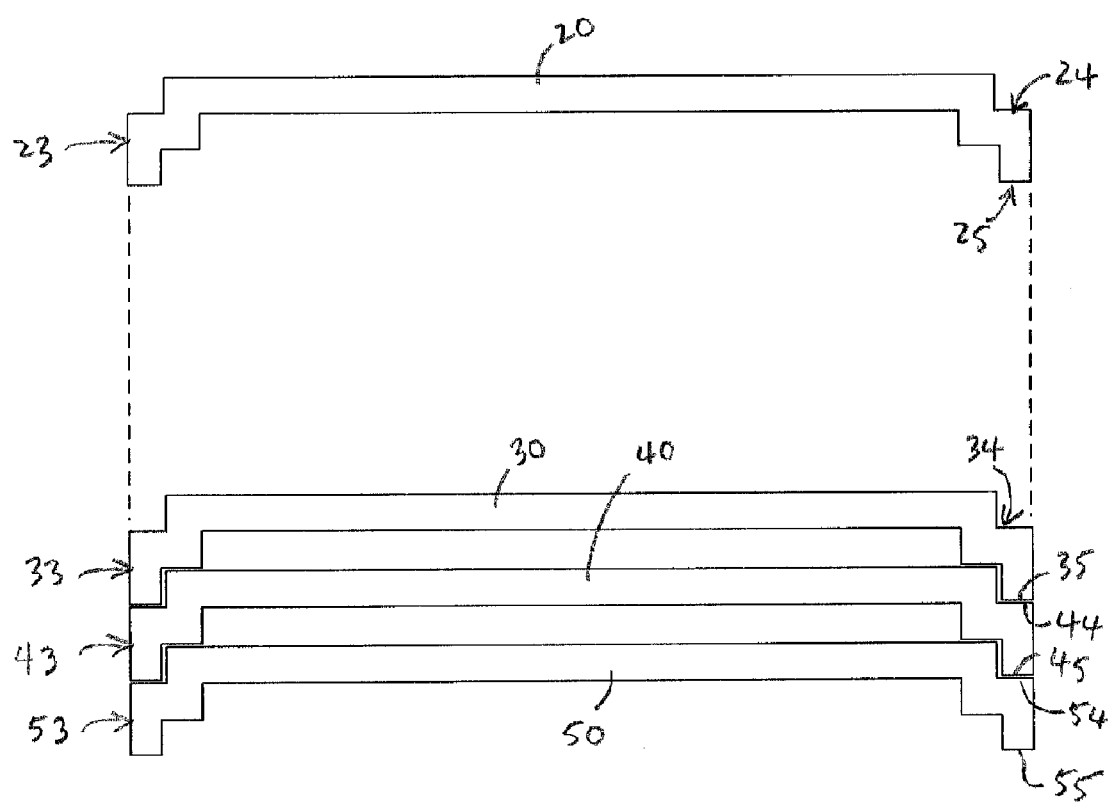
FIG. 5 shows a cross section, not drawn to scale, of the tray stack portion of the package shown in FIGS. 1-3.

FIG. 5 shows a cross section, not drawn to scale, of the stack of trays 20, 30, 40 and 50 shown in FIGS. 1 and 2. As shown in FIG. 5, the nesting ledges 24, 34, 44, and 54 and nesting rims 25, 35, 45, and 55 are shaped such that when one tray is placed on top of another tray, the nesting rim of the upper tray seats onto the nesting ledge of the lower tray, thereby preventing translational movement of the trays relative to each other.

In FIG. 5, each nesting ledge 24, 34, 44, and 54 has a substantially square profile that extends all the way around the upper perimeter of each of the trays 20, 30, 40 and 50. Each nesting rim 25, 35, 45, and 55 also has a substantially square profile that extends all the around the lower perimeter of each of the trays 20, 30, 40 and 50. It is not intended to limit the present invention to a particular shape or profile for either the nesting ledges or the nesting rims. For example, one or both of the nesting ledge and the nesting rim may have a rounded profile, or other shape, so long as each tray in the stack nests into an adjacent tray.

Figure 6:
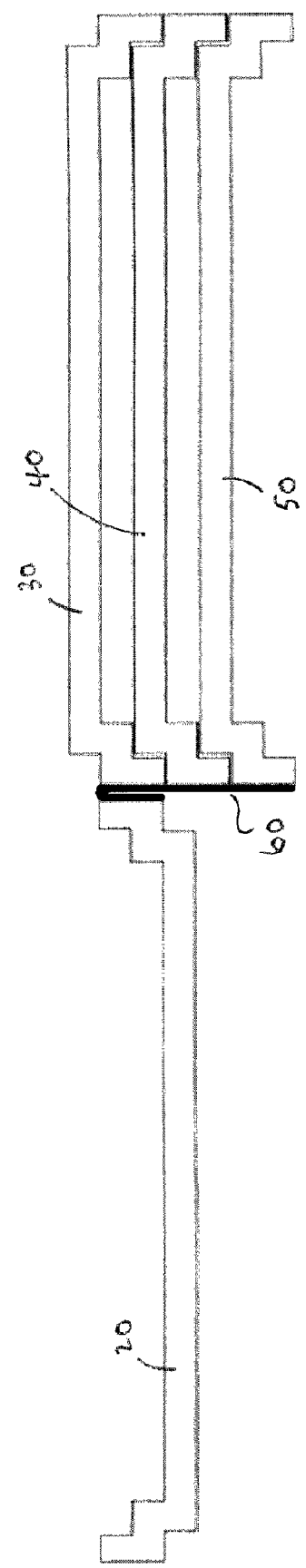
FIG. 6 shows a cross section, not drawn to scale, of the tray stack shown in FIG. 5, with a hinging label affixed thereto.

FIG. 6 shows a cross section of the stack of trays shown in FIG. 5, with hinging label 60 attached, and with tray 20 fully fanned open. It will be seen that the nesting ledges 24, 34, 44, and 45 and nesting rims 25, 35, 45, and 55 are provided with sufficient clearance to allow the trays 20, 30, 40 and 50 to be freely fanned open and closed.

Figure 7:
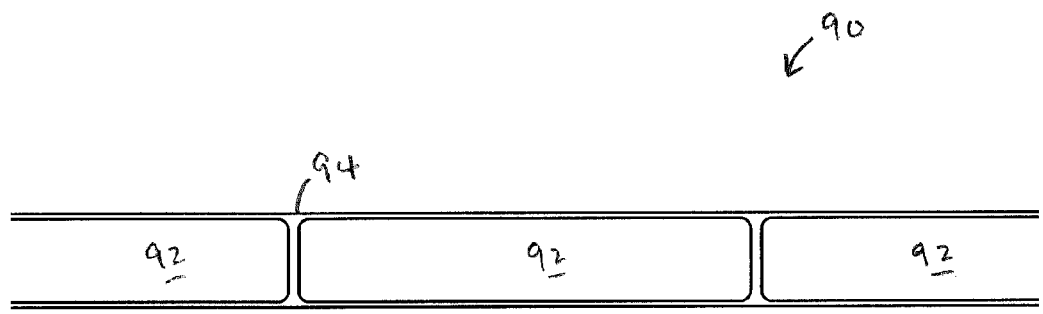
FIGS. 7 and 8 show, respectively, a plan view and a cross section, not drawn to scale, of a portion of a bulk roll of labels used in a method, according to a further aspect of the invention, for manufacturing a package for multiple media discs.
Figure 8:
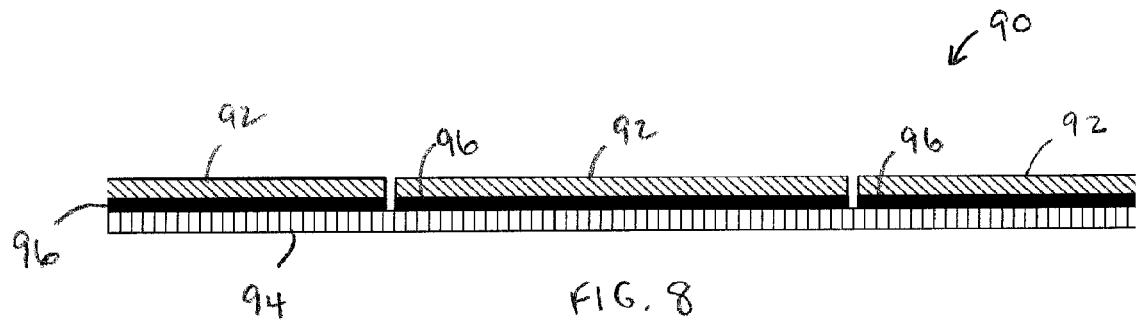

Further aspects of the invention provide techniques for manufacturing a package for multiple media discs, such as the package 10 shown in FIGS. 1-3 and described above. Labels, which can be preprinted or blank, can be provided in bulk roll form. FIGS. 7 and 8 show, respectively, a plan view and a cross section of a portion of a bulk roll 90 of individual adhesive-backed labels 92. The bulk roll 90 includes a continuous strip of backing material 94, fabricated from a suitable non-stick material, such as waxed paper or the like. The bottom surface of each label 90 is backed with an adhesive 96. According to the present aspect of the invention, the adhesive 96 anchors firmly to the composite hinging surface through the application of pressure. However, other types of adhesives, including curable adhesives, may also be used.

Figure 9:
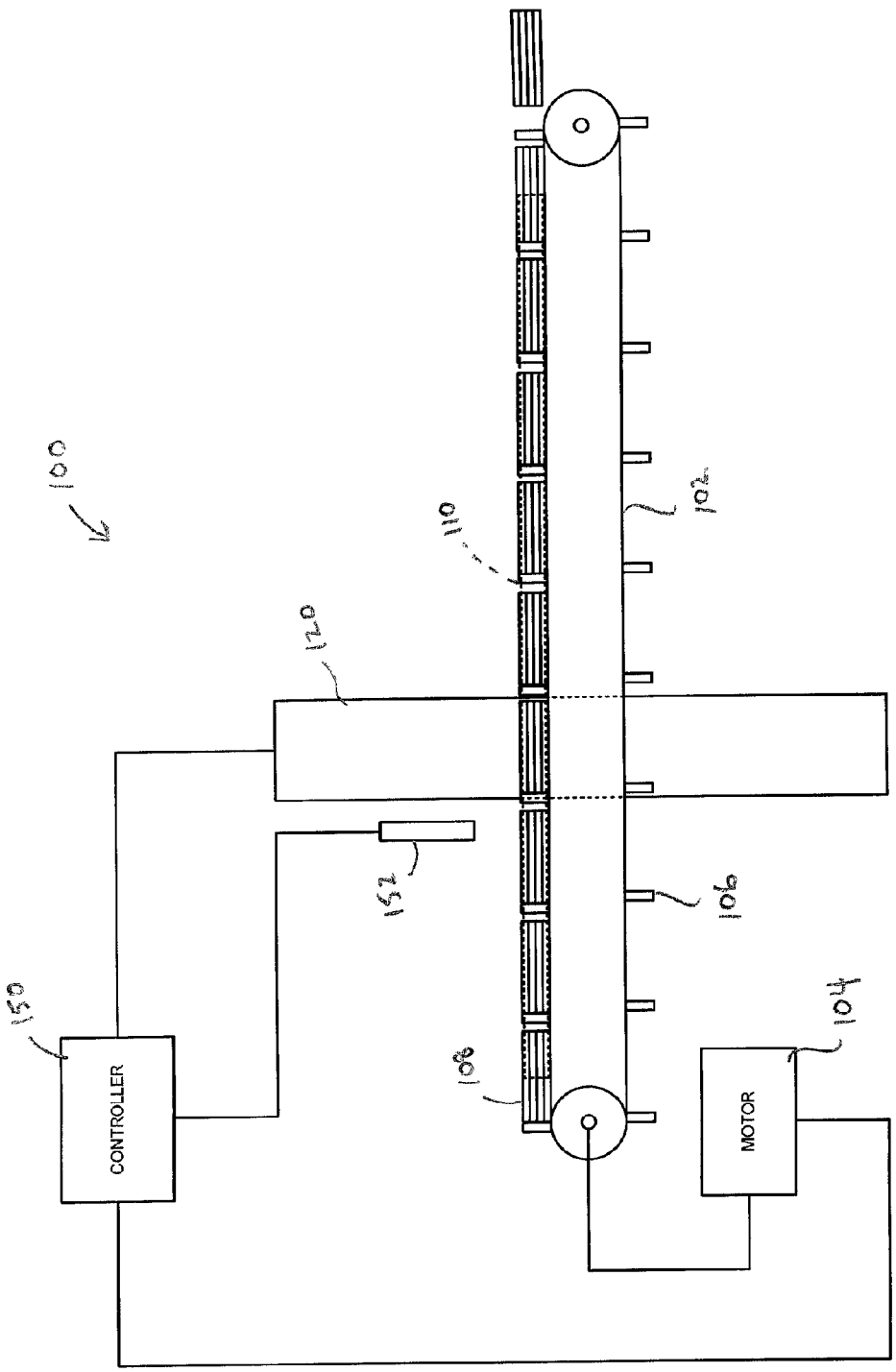
FIG. 9 shows a diagram of a system for manufacturing media disc packages according to the present invention.

FIG. 9 shows a diagram (not drawn to scale) of a high-speed system 100 for manufacturing media disc packages according to the present invention. The system includes a conveyor belt 102 that is driven by a motor 104. The conveyor belt 102 is provided with regularly spaced cleats 106 that are used to hold each tray stack 108 is position on the belt 102. In addition, one or more guide rails 110 are provided to keep each tray stack 108 in position as it travels down the length of the belt 102.

Each tray stack 108 comprises a plurality of media disc holder trays, each tray having a hinging surface on one side. The trays are then arranged into a stack, such that the respective hinging surfaces of the trays in the stack line up with each other to form a composite hinging surface 134 (FIG. 10) at one side of the tray stack 108. Each tray stack 108 is then loaded onto the conveyor belt 102 such that the respective composite hinging surfaces 134 of each of the tray stacks 108 line up with each other along one side of the conveyor belt 102.

Figure 10:
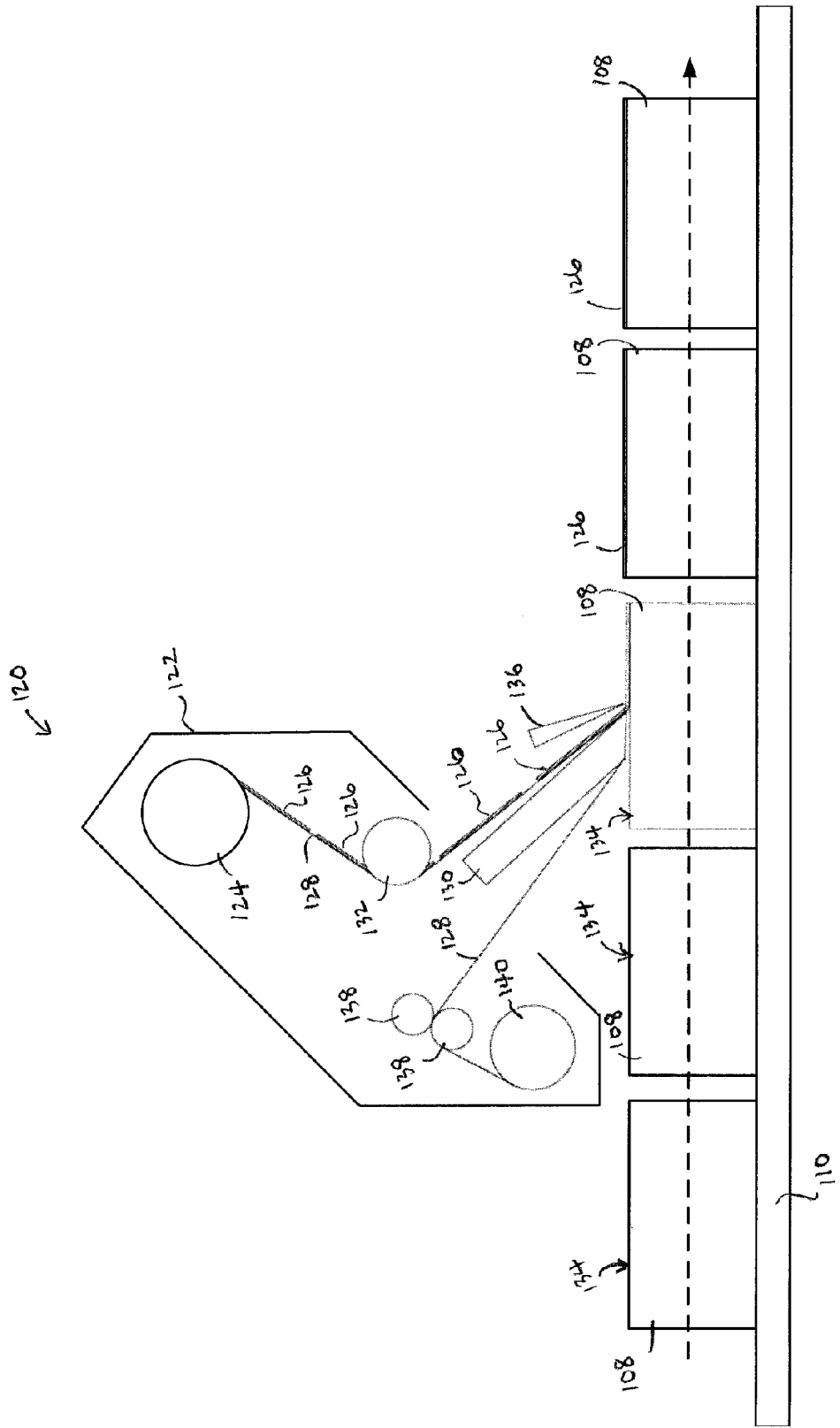
FIG. 10 shows a diagram of a label applicator subsystem used in the system shown in FIG. 9.

A label applicator subassembly 120 applies labels to the composite hinging surfaces 134 of individual tray stacks 108, as they travel down the conveyor belt 102. FIG. 10 shows a diagram (not drawn to scale) of the components of the label applicator subassembly 120, viewed from above. The label applicator 120 includes a chassis 122 into which is mounted a bulk roll 124 of adhesive labels 126. In the bulk roll 124, the adhesive labels 126 are adhered onto a peel-away backing 128. The backed labels 126 are guided to a peel bar 130 by one or more rollers 132. The backing 128 is pulled around the peel bar 130, which causes individual labels 126 to be released from the backing 128 onto the composite hinging surface 134 of a tray stack 108. A brush 136 or similar structure smoothes the applied label 126 onto the composite hinging surface 134 of the tray stack 108. The used backing 128 is guided by rollers 138 onto a waste roll 140. The label applicator 120 includes means (not shown) for adjusting the position of the label applicator relative to the conveyor belt 102.

Returning to FIG. 9, according to a further aspect of the invention, a microprocessor controller 140 provides electronic control of the various components of the labeling system 100. A photosensor 152 detects the precise position of each tray stack 108, helping to ensure that the labels are properly positioned onto their respective composite hinging surfaces 134.

It should be noted that it would also be possible to configure systems having different arrangements of trays stacks 108 on the conveyor belt 102 without departing from the spirit of the invention. For example, it would be possible to configure a system in which the tray stacks 108 are arranged on the conveyor belt 102 such that their respective hinging surfaces 134 face upwards, rather than towards a side of the conveyor belt 102. The label applicator subsystem 120 would be repositioned accordingly.

An exemplary system may be constructed using components from CTM Integration Inc. The exemplary system has the capacity to apply a single label down one 7.25 inch side of a stack of 3 to 10 individual trays, the label functioning as a hinge. The system operates at variable speeds, and is hand-loaded. The system has a maximum rate of 20 stacks per minute. The system can be sped up at any time, depending upon operator dexterity. It is desirable for the hardware to be able to handle very thin label constructions and to be reliable in industrial use.

The labeling system includes a 8'×6" Versalum Mattop conveyor, with a variable speed DC motor and controller. The conveyor belt is outfitted with 2" drive cleats, approximately 10 to 12 inches on center. The conveyor is mounted on a 4×4 welded/painted frame. The labeling head mounting hardware is attached to the same frame. The labeling head is adjustable upward and downward with a hand wheel for placement on the side of the tray stack. It also has an in/out hand wheel adjustment on a Thompson rod assembly, plus both tilt and pitch adjustments. The tilt adjustment is provided in the event that the label is not perfectly aligned with respect to the trays. The pitch adjustment is provided to allow the system to be used to apply labels to a tapered product. Guide rails are provided for good product control, and rollers are provided for 100% wipe down of the applied labels.

Fore-and-aft placement of the label is done in two ways. A coarse, one-time adjustment is done with the position of the photo detector cell used to detect the tray stack. Subsequent to the coarse adjustment, fine adjustments are completed with a label placement control on the electronic adjustment panel. Generally speaking, the repeatability of the labeler is ±1/32 in. It is desirable for the label rolls to be prepared using "precision slitting." In addition, an operator may provide online adjustments to the system to compensate for slitting "wander." The CTM labeling head has a top speed of 1200 inches per minute. An oversized label supply roll may be used.

Figure 11:
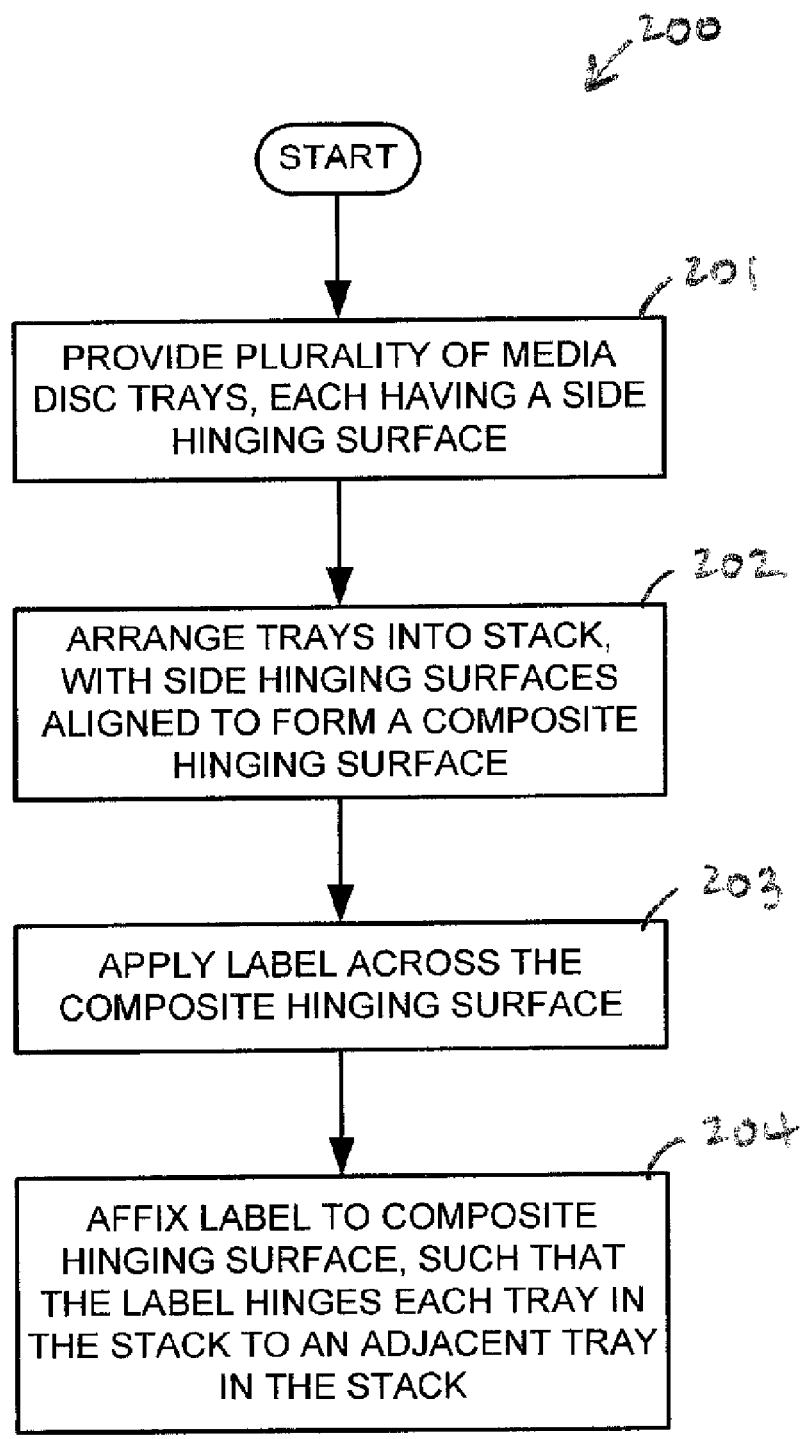
FIG. 11 shows a flowchart of a method, according to a further aspect of the invention, for manufacturing a package for multiple media discs.

FIG. 11 shows a flowchart of a method 200 according to the invention. In step 201, a plurality of media disc trays is provided. Each tray has a side hinging surface. In step 202, the trays are arranged into a stack, with the side hinging surfaces aligned with each other to form a composite hinging surface. In step 203, a label is applied across the composite hinging surface. Finally, in step 204, the label is affixed to the composite hinging surface, such that the label hinges each tray in the stack to an adjacent tray in the stack.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A method for manufacturing a package for holding multiple media discs, comprising:
   (a) providing a plurality of media disc trays, each tray having a central cavity that is shaped to receive a media disc and includes means for securing the media disc in the central cavity. each tray also including a side hinging surface, wherein the trays nest into each other when they are arranged into a stack;
   (b) arranging the trays into a stack; such that their respective side hinging surfaces line up with each other to form a composite hinging surface;
   (c) positioning a label over the composite hinging surface; and
   (d) affixing the label to the composite hinging surface, such that the label provides a hinge between each tray in the stack and at least one adjacent tray.

2. The method of claim 1, wherein the label is substantially coextensive with the composite hinging surface.

3. The method of claim 1, wherein step (c) includes removing the label from a bulk roll of labels and positioning the label over the composite hinging surface.

4. The method of claim 3, wherein the label is backed with an adhesive, and wherein in step (c) the label is peeled off of a backing.

5. The method of claim 4, wherein step (c) includes loading the stack of trays onto a conveyor belt and positioning the label onto the composite hinging surface as the stack of trays travels along the conveyor belt.

6. The method of claim 5, wherein step (d) includes using rollers to apply pressure to the adhesive label.

7. The method of claim 1, wherein in step (a) at least one of the media disc trays is loaded with a media disc prior to arranging the trays into a stack.

8. The method of claim 1, further including: (e) mounting the hinged stack of trays into an outer jacket.

9. The method of claim 1, wherein step (a) further includes: providing trays each having a nesting ledge at its upper perimeter and a nesting rim at its lower perimeter, such that the trays nest into each other when they are arranged into a stack.

10. A package for holding multiple media discs comprising:
    a stack of media disc trays, each tray including a central cavity that is shaped to receive a media disc and includes means for securing the media disc in the central cavity, each tray also having at one side a hinging edge, the hinging edges lined up with each other to form a composite hinging surface; and
    a label affixed to the composite hinging surface, the label hinging adjacent trays in the stack to each other,
    wherein each tray in the stack nests into an adjacent tray in the stack.

11. The package of claim 10, wherein the label is substantially coextensive with the composite hinging surface.

12. The package of claim 10, wherein each tray in the stack has a nesting rim at its lower perimeter and a nesting ledge at its upper perimeter, the nesting ledge of each tray being engaged by the nesting rim of an adjacent tray.

13. The package of claim 10, wherein the hinged stack of trays is mounted inside an outer jacket.

* * * * *